(12) United States Patent
Sautter

(10) Patent No.: US 10,112,591 B2
(45) Date of Patent: Oct. 30, 2018

(54) METHOD AND APPARATUS FOR OPERATING A VEHICLE

(71) Applicant: Robert Bosch GmbH, Stuttgart (DE)

(72) Inventor: Peter Sautter, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 244 days.

(21) Appl. No.: 15/307,702

(22) PCT Filed: Mar. 31, 2015

(86) PCT No.: PCT/EP2015/056958
§ 371 (c)(1),
(2) Date: Oct. 28, 2016

(87) PCT Pub. No.: WO2015/169510
PCT Pub. Date: Nov. 12, 2015

(65) Prior Publication Data
US 2017/0043755 A1    Feb. 16, 2017

(30) Foreign Application Priority Data
May 6, 2014    (DE) .................. 10 2014 208 391

(51) Int. Cl.
*B60T 8/88*    (2006.01)
(52) U.S. Cl.
CPC ......... *B60T 8/885* (2013.01); *B60T 2270/402* (2013.01); *B60T 2270/414* (2013.01)
(58) Field of Classification Search
None
See application file for complete search history.

(56) References Cited

U.S. PATENT DOCUMENTS 4,009,914 A * 3/1977 Sato .................. B60T 8/885
303/122.05
4,701,854 A * 10/1987 Matsuda ............. B60T 8/885
303/113.1
(Continued)

FOREIGN PATENT DOCUMENTS

DE    102004008935 A1    9/2005
GB       2068068 A       8/1981

OTHER PUBLICATIONS

International Search Report dated Jun. 29, 2015 of the corresponding International Application PCT/EP2015/056958 filed on Mar. 31, 2015.

*Primary Examiner* — Isaac T Tecklu
(74) *Attorney, Agent, or Firm* — Norton Rose Fulbright US LLP; Gerard Messina

(57) ABSTRACT

An apparatus for operating a vehicle, including a coupling device which is designed to decouple a speed sensor from a primary energy supply of a primary control of a primary brake-control system and to couple it to a secondary energy supply, and a control device which is designed to control the coupling device as a function of an error signal of the primary control, so that in response to an error of the primary control, the speed sensor is able to be decoupled from the primary energy supply and coupled to the secondary energy supply. A method for operating a vehicle, a system for operating a vehicle, as well as a computer program are also described.

10 Claims, 2 Drawing Sheets

(56) References Cited

U.S. PATENT DOCUMENTS

| | | | | |
|---|---|---|---|---|
| 4,722,576 | A * | 2/1988 | Matsuda | B60T 8/4291 |
| | | | | 303/116.1 |
| 5,129,713 | A * | 7/1992 | Matsuda | B60T 8/88 |
| | | | | 303/122.05 |
| 6,178,367 | B1 * | 1/2001 | Li | B60T 13/741 |
| | | | | 188/24.11 |
| 6,270,172 | B1 * | 8/2001 | Shirai | B60T 7/042 |
| | | | | 303/112 |
| 6,752,474 | B1 * | 6/2004 | Olberding | B60T 7/20 |
| | | | | 188/112 R |
| 2001/0038241 | A1 * | 11/2001 | Grote | B60T 7/042 |
| | | | | 303/112 |
| 2004/0108769 | A1 * | 6/2004 | Marathe | B60T 7/12 |
| | | | | 303/2 |
| 2004/0201270 | A1 * | 10/2004 | Suzuki | B60T 13/741 |
| | | | | 303/20 |
| 2008/0036294 | A1 * | 2/2008 | Yamamoto | B60T 7/042 |
| | | | | 303/116.1 |
| 2010/0117447 | A1 * | 5/2010 | Cahill | B60T 8/1703 |
| | | | | 303/126 |
| 2010/0262330 | A1 * | 10/2010 | Bentner | B60T 7/042 |
| | | | | 701/31.4 |
| 2013/0245888 | A1 * | 9/2013 | Kikuchi | B60G 17/0195 |
| | | | | 701/38 |

* cited by examiner

METHOD AND APPARATUS FOR OPERATING A VEHICLE

FIELD

The present invention relates to an apparatus for operating a vehicle. The present invention also relates to a method for operating a vehicle. In addition, the present invention relates to a system for operating a vehicle, as well as a computer program.

BACKGROUND INFORMATION

In the event a primary brake-control system, e.g., an ESP (electronic stability program) fails during automated driving of a vehicle, as a rule, a fallback system, for example, a secondary brake system, must take over the task of decelerating the vehicle. It is desirable that the wheels of the vehicle do not lock during this vehicle deceleration. That is to say, it is thus especially desirable that this vehicle deceleration features an antilock function. Wheel-speed information, e.g., at least two items of wheel-speed information must be available for this purpose. In order to be independent of the primary brake-control system, in addition to the rpm sensors for the primary brake-control system, conventionally, two further rpm sensors are employed, as well. This means increased expenditure for materials and assembly.

SUMMARY

An object of the present invention may be seen in the provision of an apparatus for operating a vehicle which overcomes the conventional disadvantages.

An object of the present invention may also be seen in the provision of a corresponding method for operating a vehicle.

In addition, an object of the present invention may be seen in the indication of a corresponding system for operating a vehicle.

An object underlying the present invention may also be seen in the providing of a corresponding computer program.

According to one aspect, an apparatus is provided for operating a vehicle, including:
 a coupling device which is designed to decouple an rpm sensor from a primary energy supply of a primary control of a primary brake-control system, and to couple it to a secondary energy supply, and
 a control device which is designed to control the coupling device as a function of an error signal of the primary control, so that in response to an error of the primary control, the rpm sensor may be decoupled from the primary energy supply and coupled to the secondary energy supply.

According to another aspect, a method is provided for operating a vehicle, whereby in response to an error in a primary control of a primary brake-control system, an rpm sensor is decoupled from a primary energy supply of the primary control and coupled to a secondary energy supply.

According to a further aspect, a system is provided for operating a vehicle, the system including the apparatus according to the present invention as well as a primary control, having a primary energy supply, for a primary brake-control system.

According to another aspect, a computer program is provided which includes program code for carrying out the method according to the present invention when the computer program is executed on a computer.

In particular, the present invention thus includes the idea that, in response to the occurrence of an error in the primary control signaled by the error signal, to decouple the rpm sensor from the primary control, especially from the primary energy supply of the primary control, and to couple it to the secondary energy supply. That means, namely, that in the case of an error, the rpm sensor is thus no longer supplied with energy by the primary energy supply of the primary control, but rather by the secondary energy supply. Thus, in the case of an error, the rpm sensor is supplied with energy independently of the primary control. As a consequence, operation of the rpm sensor is advantageously permitted even in the event of an error of the primary control. In other words, expressly because of this independent energy supply, the rpm sensor is able to measure or detect a speed of a vehicle wheel, even in the case of an error, and provide or make corresponding rpm-sensor signals available. Based on these rpm-sensor signals, for example, a secondary control of a secondary brake system is able to control a vehicle deceleration. Since speeds of one or more vehicle wheels are available to this secondary control, it is able to detect in advantageous manner, for example, whether a vehicle wheel is locking or is almost locking. Accordingly, based on the rpm-sensor signal, the secondary control is thus able to control the secondary brake system in such a way that during deceleration of the vehicle with the aid of the secondary brake system, locking of one or more vehicle wheels is prevented or at least decreased.

Advantageously, an already available rpm sensor that, in normal operation, is usually provided for the primary brake-control system, may continue to be used for this purpose. Additional rpm sensors do not have to be installed. The rpm sensor already present within the framework of the primary brake-control system may continue to be used or operated in the case of an error, as well. Advantageously, this saves on expenditure for materials and assembly time. In particular, that is to say that a wheel speed, which may be ascertained based on the rpm-sensor signal, is available for an external fallback solution (or fallback system), here especially the secondary control of the secondary brake system, without the need for additional rpm sensors.

According to one specific embodiment, a plurality of rpm sensors may be provided. In particular, the rpm sensors may be identical or, by preference, different. An rpm sensor within the meaning of the present invention is designed especially to measure or detect a speed of a wheel of the vehicle and to provide an rpm-sensor signal corresponding to the speed. Specific embodiments in connection with only one rpm sensor hold true analogously for specific embodiments with regard to a plurality of rpm sensors and vice versa. In particular, an rpm sensor may be referred to as a speed sensor.

According to one specific embodiment, an amplifier device may be provided to amplify a speed-sensor signal and to transmit the amplified speed-sensor signal to a secondary control of a secondary brake system, the coupling device being designed, in response to the control by the control device, to couple the amplifier device to the secondary energy supply.

According to one specific embodiment, an amplifier device may amplify a speed-sensor signal and transmit the amplified speed-sensor signal to a secondary control of a secondary brake system, the amplifier device being coupled to the secondary energy supply in response to a fault (or in the case of an error).

That means that, namely, even in the event of an error, the amplifier device may continue to be operated. The reason is that in the case of an error, it is also coupled to the secondary energy supply. For example, it may be provided that, analogous to the speed sensor, the amplifier device is likewise coupled to the primary energy supply. In the case of an error, the amplifier device is preferably decoupled from the primary energy supply and coupled to the secondary energy supply. Consequently, an amplified speed-sensor signal may advantageously be made available to the secondary control, even in the case of an error.

When, within the light of the present description, the word "coupling" is written, the intention is therefore to cover all cases: Coupling of the speed sensor to the secondary energy supply, coupling of the amplifier device to the secondary energy supply and coupling both of the amplifier device and the speed sensor to the secondary energy supply. This also holds true analogously for the "decoupling", both from the secondary energy supply and from the primary energy supply.

According to one specific embodiment, the amplifier device may be designed to trigger on one edge of the speed-sensor signal, and to transmit a signal with a predetermined level, particularly a 12-V signal, to the secondary control in accordance with this triggering.

In one specific embodiment, the amplifier device triggers on one edge of the speed-sensor signal and, in accordance with this triggering, transmits a signal with a predetermined level, especially a 12-V signal, to the secondary control.

According to a further specific embodiment, the amplifier device may be designed to trigger at one level of the speed-sensor signal, and to transmit a signal with a predetermined level, particularly a 12-V signal, to the secondary control in accordance with this triggering.

In one specific embodiment, the amplifier device triggers at one level of the speed-sensor signal and, in accordance with this triggering, transmits a signal with a predetermined level, especially a 12-V signal, to the secondary control.

According to one specific embodiment, the amplifier device may be designed to transmit the amplified speed-sensor signal to the secondary control, independently of the error signal.

According to a further specific embodiment, the amplifier device may transmit the amplified speed-sensor signal to the secondary control, independently of the error signal.

In particular, that means that even in the normal case or normal operation of the primary control (thus, when no error signal is present), the amplifier device transmits the amplified speed-sensor signal to the secondary control. In other words, the secondary control specifically receives an amplified speed-sensor signal even when the primary control is functioning properly, thus, no error exists. Namely, that means that even when the amplifier device and/or the speed sensor is/are coupled to the primary energy supply of the primary control, the amplifier device amplifies the speed-sensor signal and transmits it to the secondary control. As a consequence, the secondary control is advantageously able to monitor a speed independently of the primary control. In particular, this monitoring may be carried out by comparing the amplified speed-sensor signal to a vehicle speed signal.

According to one specific embodiment, a secondary control may be provided, which is designed to monitor the amplified speed-sensor signal by comparing the amplified speed-sensor signal to a vehicle speed signal.

According to one specific embodiment, the secondary control may monitor the amplified speed-sensor signal by comparing the amplified speed-sensor signal to a vehicle speed signal.

First of all, a speed-sensor signal is thus available, based on which a vehicle speed (first value) may be ascertained. Furthermore, independent of that, a vehicle speed signal is available, which corresponds to a vehicle speed (second value). By comparing these two values (thus, especially the corresponding signals), a deviation may be recognized in advantageous manner.

According to a further specific embodiment, the control device may be designed to control the coupling device as a function of an automatic-operation signal signaling automated vehicle operation, so that the coupling device only decouples and correspondingly couples when, in addition to the case of an error, the vehicle is being operated in automated fashion.

According to one specific embodiment, it may be provided that suitable decoupling and suitable coupling are carried out only when, in addition to the error signal, an automatic-operation signal is present which signals automated vehicle operation.

In particular, that means that two conditions must thus be satisfied in order for the speed sensor and/or the amplifier unit to be decoupled from the primary energy supply and coupled to the secondary supply: First of all, an error signal must be present. Thus, an error must have occurred in the primary control. Secondly, the vehicle must be in automated vehicle operation. This is signaled by the automatic-operation signal. That means, namely, that if the automatic-operation signal is present or exists, the vehicle is being operated in automated fashion. In particular, automated vehicle operation is characterized by the fact that the vehicle runs autonomously, independently of a driver. The vehicle is guided independently of the driver. The presence of these two conditions advantageously ensures that decoupling from the primary energy supply and coupling to the secondary energy supply are carried out only in response to an error of the primary control during automated operation of the vehicle.

In a further specific embodiment, the control device may be designed to control the coupling device as a function of a time elapsed after the corresponding coupling to the secondary energy supply, so that the coupling device decouples from the secondary energy supply accordingly.

According to a further specific embodiment, after being coupled to the secondary energy supply, the speed sensor and/or the amplifier device may be decoupled from it if a predetermined time has passed after the coupling.

In particular, that means that the secondary energy supply takes over the task of supplying energy to the amplifier device and/or the speed sensor only for a predetermined time. After this predetermined time has passed, the amplifier device and/or the speed sensor is/are decoupled from the secondary energy supply. It may thereby advantageously be ensured, for example, that the secondary energy supply does not deplete its complete energy store. This is especially relevant if the secondary energy supply includes a battery and/or an accumulator. According to one specific embodiment, after the corresponding coupling to the secondary energy supply, the amplifier device and/or the speed sensor may be decoupled from it when the vehicle has been guided into a safe state and/or the automated vehicle operation has been terminated. The latter, for instance, when a driver takes over the guidance of the vehicle again.

According to one specific embodiment, the primary control may be provided.

According to one specific embodiment, the primary brake-control system including the primary control may be provided.

According to a further specific embodiment, the secondary control may be provided.

According to a further specific embodiment, the secondary brake system including the secondary control may be provided.

According to one specific embodiment, the secondary energy supply may include a battery and/or an accumulator or be formed as a battery or accumulator, respectively. For instance, the battery or the accumulator may be a vehicle battery or a vehicle accumulator.

In general, an energy supply within the meaning of the present invention, thus, especially the primary energy supply and/or the secondary energy supply, makes electrical energy available (for example, in the form of an electric current and/or an electric voltage) for the speed sensor and/or the amplifier device.

According to one specific embodiment, the primary brake-control system may be a primary brake-control system featuring an antilock function. For example, the primary brake-control system may include an antilock braking system (ABS) and/or an ESP (electronic stability program) system, respectively.

According to one specific embodiment, the secondary brake system may include a brake booster. The brake booster is controlled especially by the secondary control. In particular, a plurality of brake boosters may be provided that may be or are controlled by the secondary control. For example, the brake boosters may be identical or, by preference, different. For instance, the brake booster may be a vacuum brake booster. The brake booster may be a hydraulic or an electrical brake booster, for example.

According to one aspect, a vehicle is provided, including the apparatus according to the present invention or the system of the present invention.

According to one specific embodiment, one or more speed sensors may be provided. In particular, the speed sensors are identical or, by preference, different.

Specific embodiments and/or functionalities and or features with regard to the apparatus or system or method, respectively, are derived analogously from the corresponding specific embodiments, functionalities and features with regard to the method or the apparatus or the system, respectively, and vice versa in any combination.

The present invention is explained in greater detail below on the basis of preferred exemplary embodiments.

DETAILED DESCRIPTION OF EXAMPLE EMBODIMENTS

Figure 1:
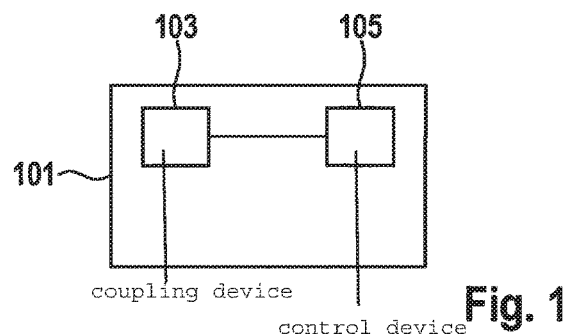
FIG. 1 shows an apparatus for operating a vehicle.

FIG. 1 shows an apparatus 101 for operating a vehicle (not shown).

Apparatus 101 includes a coupling device 103, which is designed to decouple a speed sensor from a primary energy supply of a primary control of a primary brake-control system, and to couple it to a secondary energy supply. In addition, apparatus 101 includes a control device 105 which is designed to control coupling device 103 as a function of an error signal of the primary control, so that in response to an error of the primary control, the speed sensor may be decoupled from the primary energy supply and coupled to the secondary energy supply.

Figure 2:
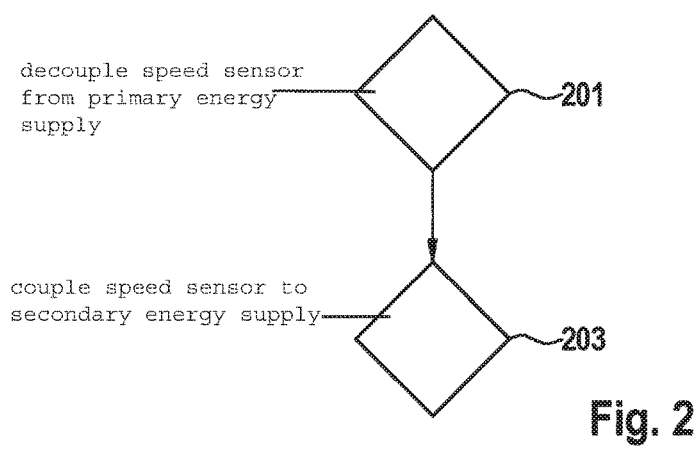
FIG. 2 shows a flowchart of a method for operating a vehicle.

FIG. 2 shows a flowchart of a method for operating a vehicle.

According to a step 201, in response to an error in a primary control of a primary brake-control system, a speed sensor is decoupled from a primary energy supply of the primary control. According to a step 203, the speed sensor is subsequently coupled to a secondary energy supply.

Figure 3:
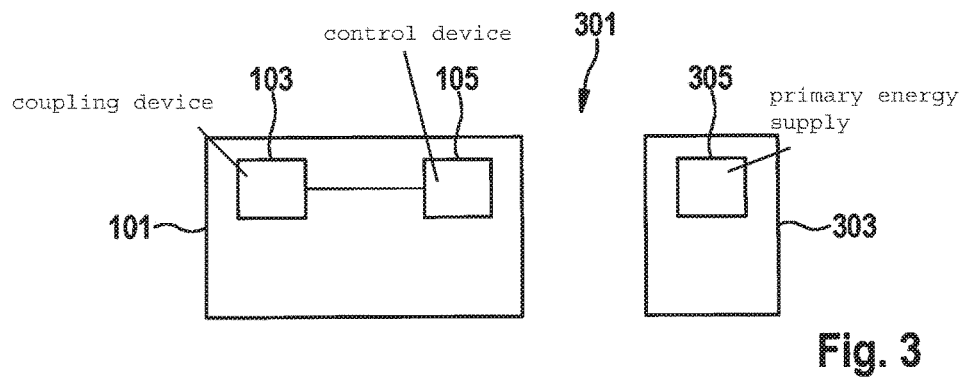
FIG. 3 shows a system for operating a vehicle.

FIG. 3 shows a system 301 for operating a vehicle (not shown).

System 301 includes apparatus 101 according to FIG. 1. System 301 also includes a primary control 303 for a primary brake-control system. Primary control 303 further includes a primary energy supply 305.

Figure 4:
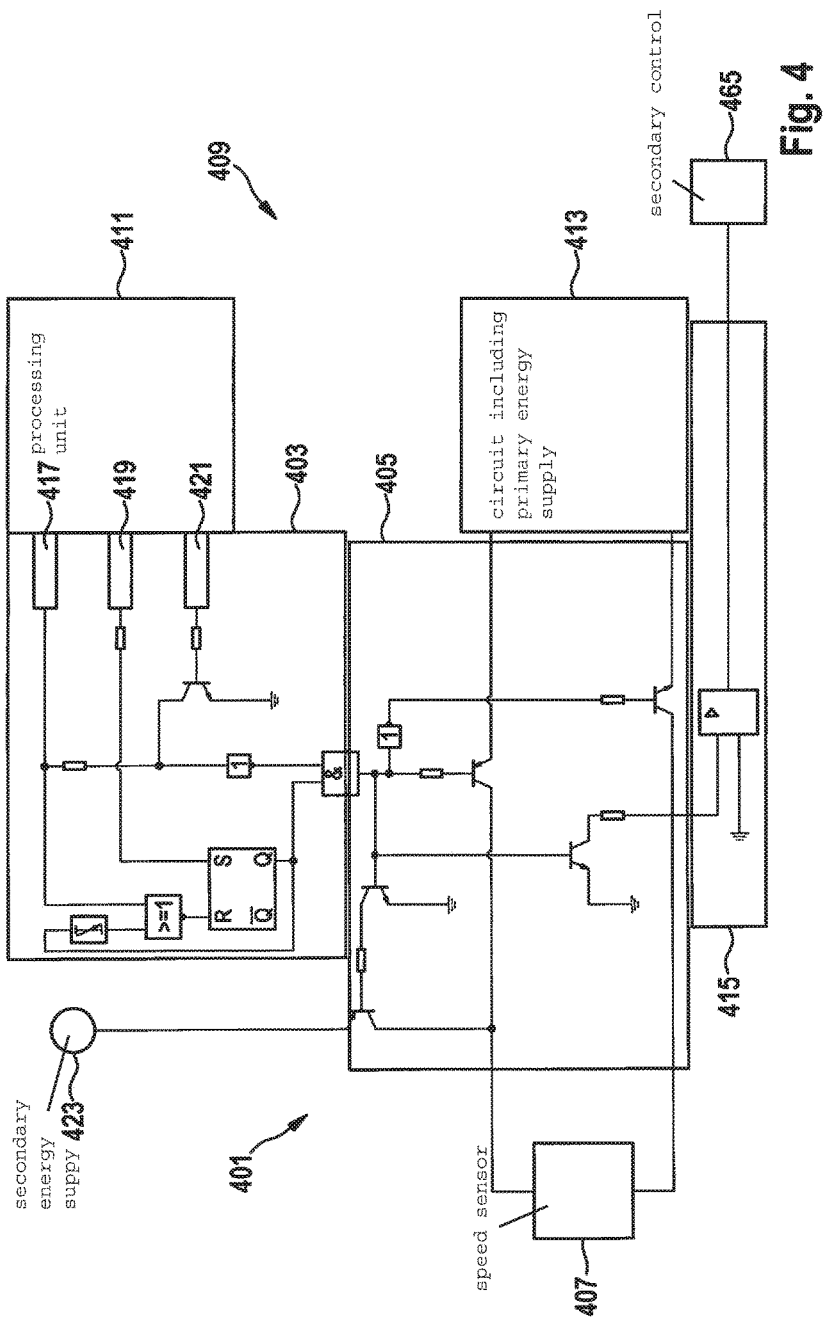
FIG. 4 shows a further apparatus for operating a vehicle.

FIG. 4 shows a further apparatus 401 for operating a vehicle (not shown).

Apparatus 401 includes a control device 403, as well as a coupling device 405 and an amplifier device 415. In addition, a primary control 409 is provided for a primary brake-control system. Primary control 409 includes a processing unit 411, which is able to regulate a deceleration of the vehicle based on speed-sensor signals from a speed sensor 407. Primary control 409 also includes a circuit 413 (not further shown in detail) including a primary energy supply (not shown), as well as an evaluation unit (not shown) for the speed-sensor signals of speed sensor 407. The control is carried out by central processing unit 411 based on the evaluated speed-sensor signals.

Reference numerals 417, 419, 421 point to signals which processing unit 411 is able to output. If signal 417 is set to a logical low, it is an error signal. If signal 419 is set to a logical high, it corresponds to an automatic-operation signal. In particular, that means that in automated vehicle operation, signal 419 is thus set to a logical high. If signal 421 is set to a logical high, this corresponds to a test signal, so that a test operation of apparatus 401 may be carried out. In such a test operation, it is tested whether the decoupling of speed sensor 407 from the primary energy supply and the subsequent coupling to a secondary energy supply 423, which, for example, may be a vehicle battery, is functioning. In one specific embodiment not shown, instead of the logical level indicated above, its corresponding opposite counterpart may be provided, thus, instead of a logical high, a logical low and vice versa.

Circuit diagrams are drawn in in elements 403, 405 and 415 for the purpose of illustration, the circuit diagrams having electronic components such as resistors and transistors familiar to one skilled in the art. The customary circuit symbols have been used for the electronic components of the circuit diagrams. Therefore, dedicated reference numerals were omitted. The coupling/decoupling according to the present invention may be brought about with the aid of the exemplary circuit diagrams. However, the intention is not to limit the invention only to the circuit diagrams shown. They are only by way of example, not restrictive. Other circuit diagrams are possible, especially so long as the effect (coupling and decoupling) according to the present invention results.

Amplifier device 415 amplifies the speed-sensor signal and transmits the amplified speed-sensor signal to a secondary control 465 of a secondary brake system (not further shown). Coupling device 405, responsive to the control by control device 403, is designed to couple amplifier device 415 to secondary energy supply 423. Secondary control 465 is able to control a vehicle deceleration based on the amplified speed-sensor signals. Since speeds of one vehicle wheel or several vehicle wheels are thus available to secondary control 465, it is able to detect in advantageous manner, for example, whether a vehicle wheel is locking or is almost locking. Accordingly, based on the speed-sensor signal, secondary control 465 is thus able to control the secondary brake system in such a way that upon deceleration of a vehicle with the aid of the secondary brake system, locking of one or more vehicle wheels is prevented or at least decreased.

What is claimed is:

1. An apparatus for operating a vehicle, comprising:
a coupling device designed to decouple a speed sensor from a primary energy supply of a primary control of a primary brake-control system, and to couple the speed sensor to a secondary energy supply; and
a control device designed to control the coupling device as a function of an error signal of the primary control so that in response to an error of the primary control, the speed sensor is able to be decoupled from the primary energy supply and coupled to the secondary energy supply.

2. The apparatus as recited in claim 1, further comprising:
an amplifier device is provided to amplify a speed-sensor signal and to transmit the amplified speed-sensor signal to a secondary control of a secondary brake system, the coupling device being designed to, responsive to the control by the control device, couple the amplifier device to the secondary energy supply.

3. The apparatus as recited in claim 2, wherein the amplifier device is designed to transmit the amplified speed-sensor signal to the secondary control, independently of the error signal.

4. The apparatus as recited in claim 2, further comprising:
a secondary control designed to monitor the amplified speed-sensor signal by comparing the amplified speed-sensor signal to a vehicle speed signal.

5. The apparatus as recited in claim 1, wherein the control device is designed to control the coupling device as a function of an automatic-operation signal signaling automated vehicle operation, so that the coupling device decouples and correspondingly couples only when, in addition to the case of an error, the vehicle is being operated in automated fashion.

6. The apparatus as recited in claim 1, wherein the control device is designed to control the coupling device as a function of a time elapsed after the corresponding coupling to the secondary energy supply, so that the coupling device decouples from the secondary energy supply accordingly.

7. A method for operating a vehicle, comprising:
providing a coupling device designed to decouple a speed sensor from a primary energy supply of a primary control of a primary brake-control system, and to couple the speed sensor to a secondary energy supply;
providing a control device designed to control the coupling device as a function of an error signal of the primary control so that in response to an error of the primary control, the speed sensor is able to be decoupled from the primary energy supply and coupled to the secondary energy supply; and
controlling by the control device, in response to the error in the primary control of a primary brake-control system, the coupling device to decouple the speed sensor from the primary energy supply of the primary control and to couple the speed sensor to the secondary energy supply.

8. The method as recited in claim 7, further comprising:
amplifying, by an amplifier device, a speed-sensor signal and transmitting the amplified speed-sensor signal to a secondary control of a secondary brake system, the amplifier device being coupled to the secondary energy supply in response to an error.

9. A system for operating a vehicle, comprising:
a primary control having a primary energy supply for a primary brake-control system; and
an apparatus including a coupling device designed to decouple a speed sensor from the primary energy, and to couple the speed sensor to a secondary energy supply, and a control device designed to control the coupling device as a function of an error signal of the primary control so that in response to an error of the primary control, the speed sensor is able to be decoupled from the primary energy supply and coupled to the secondary energy supply.

10. A non-transitory computer-readable storage medium on which is stored a computer program for operating a vehicle, the computer program, when executed by a processor, causing the processor to perform, in a vehicle including a coupling device and a control device:
in response to an error in a primary control of a primary brake-control system, controlling the coupling device by the control device, to decouple a speed sensor from a primary energy supply of the primary control and to couple the speed sensor to a secondary energy supply;
wherein the coupling device is designed to decouple the speed sensor from the primary energy supply of the primary control of the primary brake-control system, and to couple the speed sensor to the secondary energy supply, and
the control device is designed to control the coupling device as a function of an error signal of the primary control so that in response to the error of the primary control, the speed sensor is able to be decoupled from the primary energy supply and coupled to the secondary energy supply.

* * * * *